(12) United States Patent
Smith et al.

(10) Patent No.: US 6,772,369 B2
(45) Date of Patent: Aug. 3, 2004

(54) SYSTEM OBSERVATION BUS

(75) Inventors: Brian L. Smith, Sunnyvale, CA (US); Jordan Silver, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 549 days.

(21) Appl. No.: 09/829,557

(22) Filed: Apr. 9, 2001

(65) Prior Publication Data

US 2002/0147940 A1 Oct. 10, 2002

(51) Int. Cl.$^7$ ................................................ G06F 11/00
(52) U.S. Cl. ............................ 714/31; 714/30; 714/32; 714/25
(58) Field of Search ............................... 714/30, 31, 32

(56) References Cited

U.S. PATENT DOCUMENTS

| | | | | |
|---|---|---|---|---|
| 5,253,255 A | * | 10/1993 | Carbine | 714/734 |
| 5,519,715 A | | 5/1996 | Hao et al. | |
| 5,600,788 A | * | 2/1997 | Lofgren et al. | 714/31 |
| 5,828,824 A | * | 10/1998 | Swoboda | 714/25 |
| 5,867,644 A | | 2/1999 | Ranson et al. | |
| 6,141,775 A | * | 10/2000 | Lee et al. | 714/30 |
| 6,145,098 A | * | 11/2000 | Nouri et al. | 714/31 |

FOREIGN PATENT DOCUMENTS

WO    WO 00/07103    2/2000

OTHER PUBLICATIONS

International Search Report mailed Sep. 17, 2003 No. PCT/US 02/10108.

P.K. Jaini and N.A. Touba, "Observing Test Response of Embedded Cores through Surrounding Logic", Proc. of IEEE International Symposium on Circuits and Systems, pp. 119–123, 1999.

Jan Håkegård: Board Level Boundary Scan Testing and Test Controllers, CADLAB Memo 95–01, Department of Computer and Information Science, Linköping University, 1995.

* cited by examiner

*Primary Examiner*—Nadeem Iqbal
*Assistant Examiner*—Christopher M Euripidou
(74) *Attorney, Agent, or Firm*—Meyertons Hood Kivlin Kowert & Goetzel, P.C.; Rory D. Rankin (57) ABSTRACT

A method and mechanism for configuring a node in a computing system to route data to a predetermined observation point. A node in a computing device or system is configured to identify and convey an observation data stream via a non-critical path. A non-critical path is configured within the computer system for the transmission of the generated stream of data to a convenient client location where the data may be observed. This stream of data is routed through the computer system via disabled, replicated, monitor or other links which correspond to a non-critical path. The observation data stream conveyed by the node may be generated by the node and correspond to an internal state of the node. Additionally, the node may be configured to duplicate and convey received data streams or extract debug data from a received data stream for conveyance to a predetermined observation point. By setting up a series of routing streams through a system, a circuit switched network may route observation data streams from any node in a system to any other node in the system.

35 Claims, 7 Drawing Sheets

SYSTEM OBSERVATION BUS

BACKGROUND OF THE INVENTION

1. Field of the Invention

This invention is related to the field of digital communications and, more particularly, to the test and debug of digital systems.

2. Description of the Related Art

One of the more important aspects of developing electronic and digital systems is that of test and debug. For example, during the design process of a computer system, multiple iterations of test and debug are typically done on various portions of the system prior to actually constructing the system. At some point, a sufficient degree of confidence is obtained in the design and a system utilizing the design is actually constructed. Upon constructing such a system, further test and debug is a necessary part of the process.

Numerous well known methods of test and debug exist for the purpose of debugging circuits and systems subsequent to fabrication. One of the more common tools used in test and debug involves the use of probes. Frequently, during test or debug of a system, the test engineer wishes to observe the behavior of a particular circuit or subsystem during system operation. Because the circuit or subsystem may be embedded in a circuit board or package, access to the circuit or subsystem may be limited. Typically, probes are attached to externally accessible circuit points. In the past, probes may have included alligator clips or spring-loaded oscilloscope grabbers. For the more difficult to access points, flat-ended, toothless alligator clips may have been utilized. However, with the miniaturization of circuits and packaging over the past years, the challenge of probing and testing has grown considerably. Because of the very small pitches of newer packages, attaching probes has become very difficult. Further, newer packaging techniques such as ball grid array (BGA) make it impossible to probe every connection. Therefore, changes to the physical characteristics of the system may be required which could be disruptive of the environment under test. Also, access to external circuit points may not provide details of the internal state of the circuit itself. Rather, only that information which is conveyed via the probed circuit points will be seen. For example, if access is only obtainable to a communication port or bus on a circuit board, the internal state of a particular control circuit or processor on that circuit board may not be observable. Consequently, the test engineer may be limited in his ability to adequately debug the system.

A second method which is sometimes used to gain access to operational and debug information is the use of "windows". In this context, a window may be defined as a an access point which is deliberately created for the purpose of observation during test and debug. However, such a technique frequently involves the use of dedicated pins which may increase the pin count. Alternatively, a window may be created by multiplexing existing pins to create an observation point. However, such a technique also involves altering the normal design and operational environment. Further, if window pins are captured in a dedicated storage facility, rather than leading to probe points, the gate count of the design may be increased.

A third method of obtaining access to test and debug information is through the use of well known scan based technologies which were developed to address some of the loss of access problems described above. Unfortunately, the capture and shift, pause and stop nature of the scan based testing may also interfere with normal system timing.

In addition to the difficulties discussed above, other challenges exist in test and debug of systems subsequent to fabrication or construction. Because of the desire to test systems as they might appear in the real world, tests engineers are frequently faced with the challenge of working with systems which are fully constructed within a chassis. Consequently, in order to access the internal components of a system, some form of physical access must be created which does not materially interfere with the ordinary operation of the system. If a cut-out is created in the chassis in order to gain access, the normal airflow and cooling of the system may be changed. Consequently, ordinary operation of the system may be altered. Other options may include soldering probe connections to the desired observation points and running connection lines outside the chassis. However, such reworking of circuit boards can be an arduous task and may interfere with the electrical characteristics of the circuitry. Further, these problems may become magnified in the context of multiprocessor computer systems which include densely populated circuit boards. Still further, even if some form of connection access is achieved, the internal state of processors, application specific integrated circuits (ASICs), and other devices may not be obtained by simply observing information conveyed via these accessible circuit points.

In view of the above described problems, as well as others, a method and mechanism of test and debug which primarily utilizes normal and required design constructs without interfering with normal system timing is desired.

SUMMARY OF THE INVENTION

The problems outlined above are in large part solved by a method and mechanism as described herein. In one embodiment, a method for routing observation data to a convenient observation point in a computer system is described. The method includes configuring a node to identify and route observation data via a non-critical path to a predetermined observation point. In one embodiment, the node is configured to generate a data stream which corresponds to the internal state of the device and convey this data stream via the non-critical path to the observation point. Alternately, the node may be configured to duplicate a received data stream, convey the received data stream via a normal operational data path, and convey the duplicated data stream via the non-critical path. Also contemplated is an embodiment wherein the node is configured to identify and extract debug data from within a received data stream, convey the extracted debug data via a non-critical path to an observation point, and convey the remainder of the data stream via a normal operational data path. In general, the non-critical path may comprise dedicated, disabled, replicated, or otherwise non-critical lines, such as error correcting code (ECC) lines which are not required for operation.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

As discussed above, it is frequently desirable during test and debug to be able to observe the internal state of individual ASICs, CPUs, or other devices in a system. Generally speaking, the method and mechanism described herein contemplates configuring one or more nodes to route a received or generated data stream to a particular observation point. In one embodiment, a circuit switched network utilizing normal design constructs is established to route the data stream to an observation point via a non-critical path. In this context, a circuit switched network is one in which a dedicated series of links are established for routing the data. In addition to using the method to observe the internal state of a device, the method may also be used to duplicate and route an ordinary communication stream, or other operational data, to a desired observation point. Further, debug information may be inserted into an in-use or otherwise critical path which may then be tapped and routed in a non-timing critical manner to a desired observation point. Numerous variations and applications of the method and mechanism described herein will become apparent to those skilled in the art.

Overview

Figure 1:
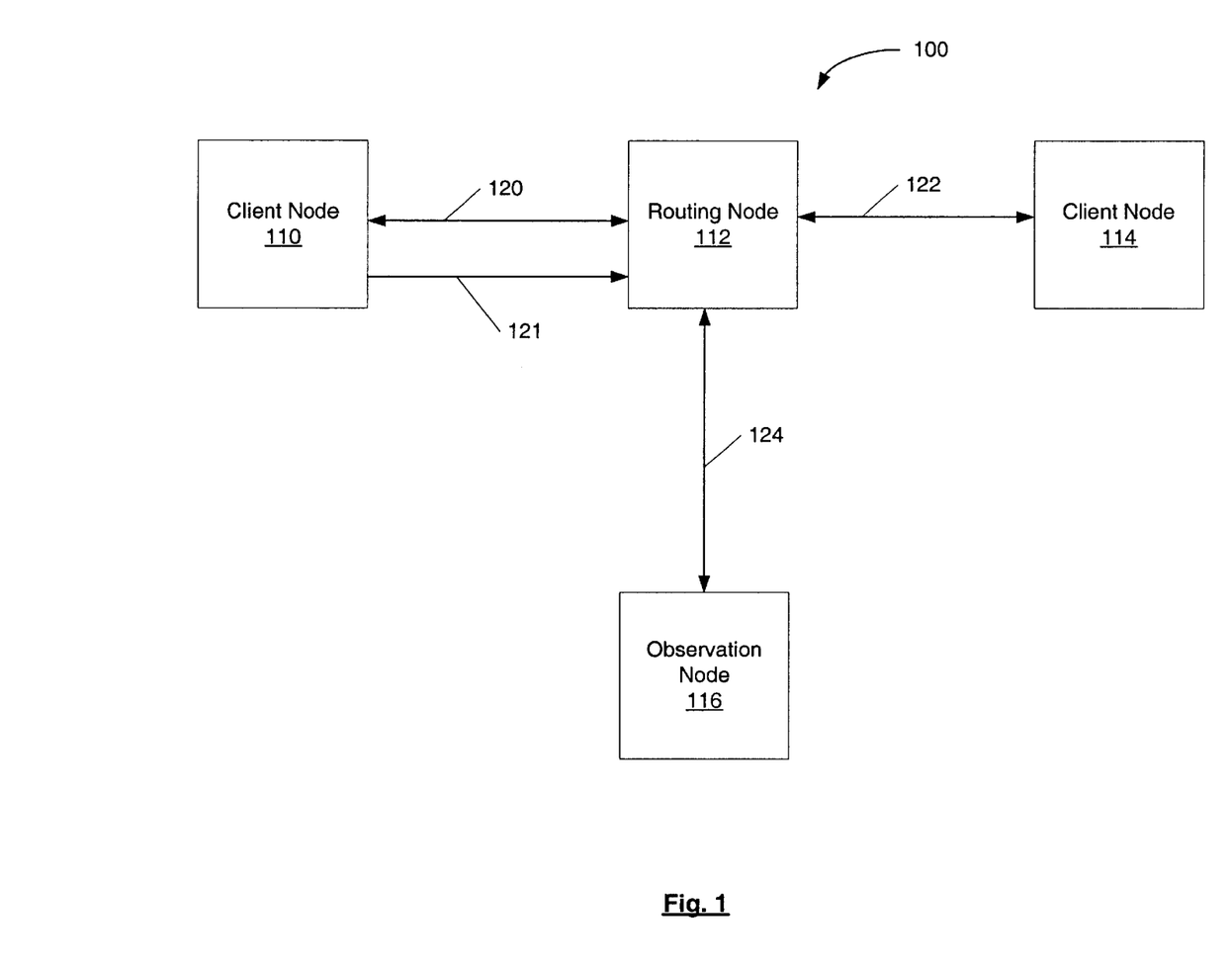
FIG. 1 is a diagram of one embodiment illustrating a method of observation.

Turning now to FIG. 1, a block diagram illustrating one embodiment for routing and observing data streams is shown. Included in FIG. 1 are client nodes 110 and 114, routing node 112, and observation node 116. In the embodiment shown, client node 110 is coupled to routing node 112 via links 120 and 121, client node 114 is coupled to routing node 112 via link 122, and observation node 116 is coupled to routing node via link 124. During ordinary operation, routing node 112 may be configured to convey communications between client nodes 110 and 114 via links 120 and 122, respectively.

In the example of FIG. 1, it may desired to observe the internal state of node 110 during system operation. Consequently, node 110 is configured to generate a stream of data corresponding to its internal state (a "status" stream) for observation. However, direct access to node 110 for the purpose of observing the status stream may not be possible without impacting the normal operating environment. In order to provide access to the status stream, node 110 is configured to convey the status stream to routing node 112. Routing node 112 is then configured to route the received status stream to observation node 116 where the status stream may be captured or otherwise observed. In one embodiment, node 110 is configured to route the normal operational data stream to routing node 112 via link 120 and the generated status stream via a non-critical path 121 (e.g., a disabled link). Advantageously, the internal state of node 110 may be routed to and observed at a convenient observation point 116 without compromising basic system operation. Alternatively, inputs seen on links 120 may be copied to links 121. Further, in certain embodiments this may allow the tracing of data packets through a system to determine where they get lost without having to probe individual nodes along the path. Advantageously, the method essentially provides virtual breakout boards for any node in the system without affecting the signal integrity of the observed links. Further, it may definitively tells us what a chip actually observes (as opposed to what a breakout board would observe).

From the above description, a number of uses and advantages may be seen. The internal state of a chip may be observed by an observation client or node at a convenient location. Also, patterns which are input to a particular chip may be observed by routing them to an observation point as well. In one embodiment, the rate of observation of a conveyed data stream may be configured to match its generation rate in order to capture data on every clock cycle. For example, to monitor a 400 Mz signal, four 100 MHz monitor signals may be utilized to time multiplex the signal to an observation node. In order to avoid interfering with the normal operating environment, dedicated, disabled, replicated (e.g., RAID or fully redundant duplication of lines), or non-critical lines (e.g., ECC or parity lines which may be ignored) may be used to route data pattern streams. Further, as will be discussed below, a second data stream may be used to aid in analysis of a captured data stream or as a reference to aid in synchronizing two separately captured data streams in order to construct a "wider" sequence of patterns from a "narrower" sampling of a subset of signals. In yet another embodiment, debug information may be inserted into in-use and/or critical paths which is then routed to an observation point in a non-timing critical manner. In the following discussion, a variety of exemplary embodiments are used to further illustrate the method and mechanism.

Employing the Method and Mechanism

The method and mechanism exemplified by FIG. 1 may be utilized in any number of contexts. Further, the nodes depicted in FIG. 1 may represent a variety of devices. For example, all of the nodes depicted in FIG. 1 may represent a computing system or be contained within a single processing chip, the client nodes may each represent circuit boards coupled to a computing system where the routing node provides for communication between the boards, each client node may represent a node or cluster in a computing network with the routing node representing a network interconnect, and so on. Virtually any chip may be selected and configured for use as a switch for routing data. For example, even a single processor has input and output ports in which an internal selection may be made to indicate a particular output port to route received data. Advantageously, normal (and required) design constructs may be utilized to implement the embodiments described herein and otherwise contemplated. Those skilled in the art will appreciate the numerous applications of the method and mechanism as described herein.

Figure 1A:
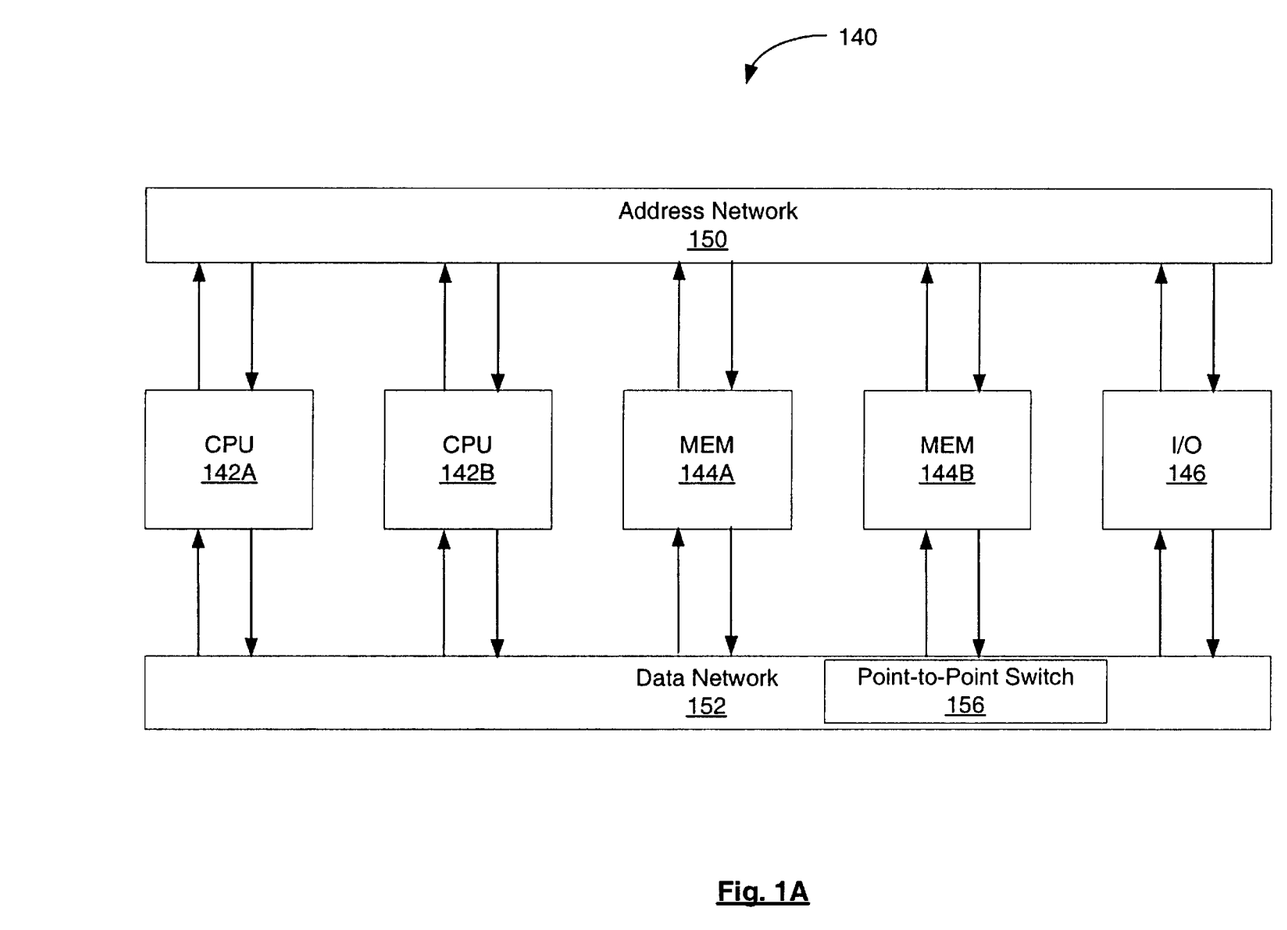
FIG. 1A is a diagram of one embodiment of a computer system.

Turning now to FIG. 1A, a block diagram of one embodiment of a computer system 140 in which the above described method may be utilized is shown. Computer system 140 includes CPU 142A and CPU 142B, MEM 144A and MEM 144B, and I/O bridge 146. Elements referred to herein with a particular reference number followed by a letter will be collectively referred to by the reference number alone. For example, CPUs 142A–142C will be collectively referred to as CPUs 142. Also included in FIG. 1A are an address network 150 and a data network 152. In one embodiment, address network 150 is a broadcast network and data network 152 is a point-to-point network including a point-to-point switch 156, though any suitable type of network may be used for either address network 150 or data network 152.

In the example of FIG. 1A, CPU 142A may be configured to generate a stream of data representing its internal state. However, there may not exist a means of direct access to the generated stream of data in a manner that does not interfere with the normal operating environment of the system 140. In one embodiment, an observation point may be established via I/O bridge 146. For example, a logic analyzer or other data capture device may be coupled to system 140 via I/O bridge 146. Further, CPU 142A may not be directly coupled to I/O bridge 146 through a single switching element of network 152. Rather, CPU 142A may be coupled to a first switching element of switch 156 which is coupled to a second switching element, which is finally coupled to I/O bridge 146. Consequently, a path between CPU 142A and I/O bridge 146 which does not interfere with the normal operations of system 140 must be established. In order to establish such a path, CPU 142A is configured to route the generated status stream out a non-critical port such as the dedicated, disabled, replicated, or otherwise non-critical lines as described above. Network 152 and switch 156 is then configured to established a dedicated path between CPU 142A and I/O bridge 146.

In the embodiment shown in FIG. 1A, a first switching element within switch 156 is configured to receive the status stream from CPU 142A and is configured to convey the received stream to a second switching element within switch 156 via a non-critical port. The second switching element within switch 156 is then configured to convey the received status stream to I/O bridge 146 via a non-critical port. While only two switching elements are described in the path above, any number of switching elements, or "hops", may be utilized in creating the path between CPU 142A and the destination observation point. Further, the path which is created may include other devices within system 140, such as CPU 142B. Still further, a status stream for any element of system 140 (e.g., a switching element within switch 156) may be observed by routing it to the desired observation point. Finally, upon arriving at the destination observation point 146, the status stream may be observed, captured, or otherwise utilized. In this manner, observation of the internal state of CPU 142A is made possible by using normal design constructs and without materially impacting normal system operation or timing.

Figure 2:
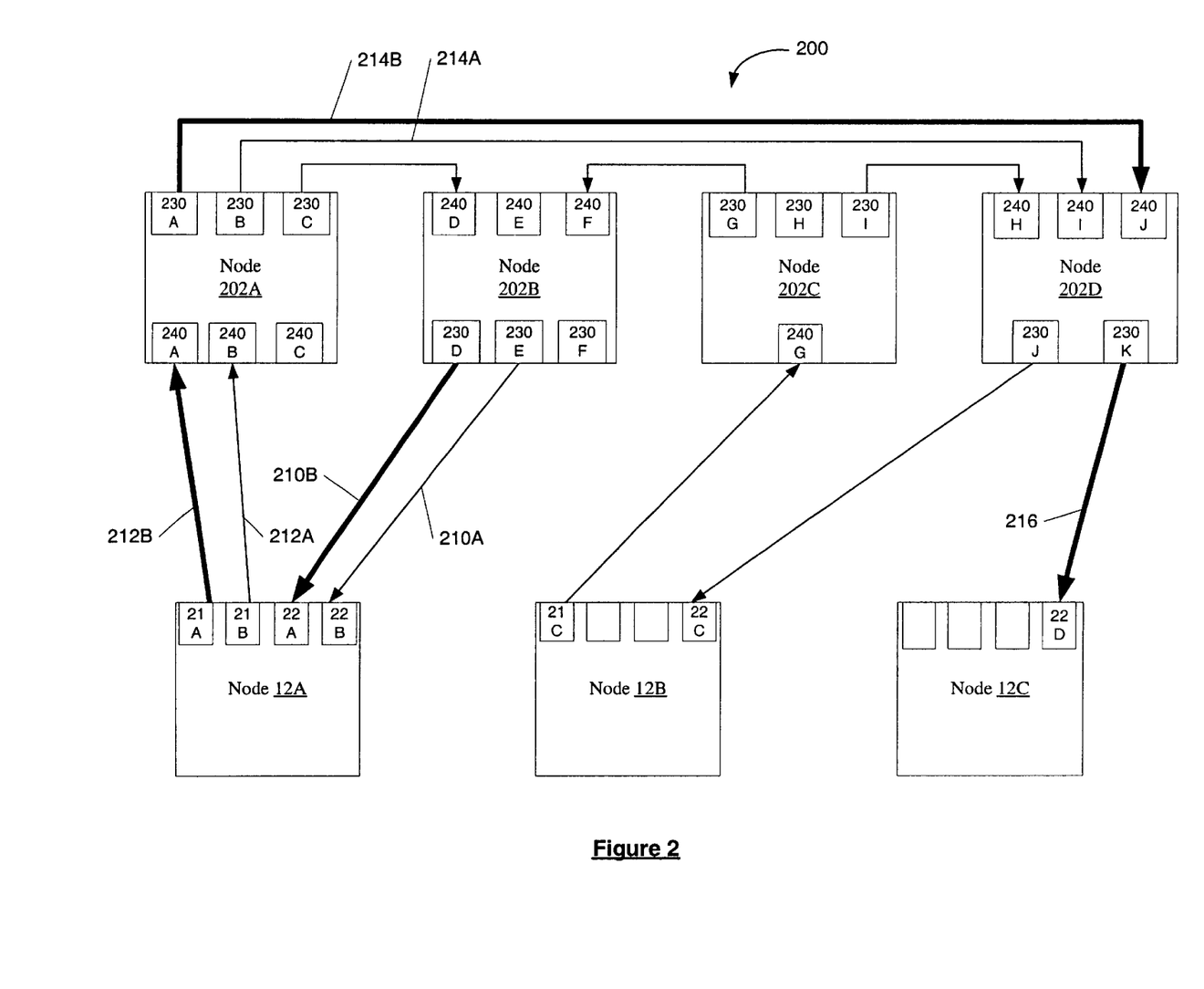
FIG. 2 is a diagram of one embodiment of a mechanism for observing data.

Turning now to FIG. 2, an exemplary block diagram of an alternative computing system 200 is shown. Included in FIG. 2 are nodes 12A–12C and nodes 202A–202D. Each of nodes 12 include ports 21 and 22, and nodes 202 include ports 230 and 240 for transmitting and receiving data. In various embodiments, nodes 202 and 12 may correspond to a single chip, a single system board, multiple chips, multiple boards, or otherwise. For example, in one particular embodiment, nodes 202 may correspond to a point-to-point interconnect and nodes 12 may correspond to processors in an SMP computing system. In such an embodiment, nodes 202 may be configured to act as switches for the routing of data between nodes 12 in system 200. As shown in FIG. 2, node 12 input ports 22A, 22B and 22C are coupled to receive data from node 202 ports 230D, 230E and 230J, respectively. Node 12 output ports 21A, 21B and 21C are coupled to convey data to node 202 ports 240A, 240B and 240G, respectively. In addition, node 202A output ports 230A, 230B and 230C are coupled to node input ports 240D, 240I and 240J, respectively. Finally, node 202C output ports 230G and 230I are coupled to node input ports 240F and 240H, respectively.

Referring to FIG. 2, assume it is desired to observe the internal state of node 202B during operation and that one desires to observe that internal state via node 12C. In one embodiment, a logic analyzer may be coupled to the destination node 12C for observation and analysis of data. Alternatively, destination node 12C may be configured to write the received data to a memory or other storage device for later analysis. First the node 202B may be configured to generate a data stream which corresponds to its internal state. Next, the data stream must be conveyed to the destination node 12C. However, transmitting the data stream corresponding to the internal state over the same path as normal operational data may impact normal operation of the system. Therefore, rather than conveying the internal state data stream via the ordinary path, an alternate, non-critical path is configured. Such a non-critical path may include ports which are disabled, replicated, are dedicated as monitor ports, or are otherwise non-critical. Utilizing this non-critical path, the internal state data stream is routed from node 202B, through node 12A, through node 202A, through node 202D, and to node 12C.

In the illustration of FIG. 2, separate ports have been utilized to convey the desired data streams. Node 202B includes a path 210A to Node 12A for normal operational data which utilizes port 230E and port 22B. Rather than using this path 210A for transmission of the internal state data stream, an alternate path 210B is utilized which includes port 230D and port 22A. Node 12A is also coupled to node 202A via a normal data path 212A including port 21B and port 240B, as well as an alternate path 212B including port 21A and port 240A. Node 202A is coupled to node 202D via a normal data path 214A including port 230B and port 240I, as well as an alternate path 214B including port 230A and port 240J. Finally, node 202D is coupled to node 12C via path 216 which utilizes port 230K and port 22D. In this manner, a series of routing streams are set up whereby the existing system interconnect may be used to route observability data to a convenient client slot 12C for collection and analysis.

Observing Inserted Debug Information and Cloned Data Streams

As mentioned above, the method may also be used to observe debug information which has been inserted into an in-use stream. As an illustration, referring again to FIG. 2, node 202A may be configured to insert debug information into a received data stream prior to conveying it to another node. For example, node 12A may convey a stream of data packets via link 212B to node 202A during normal system operation. In turn, node 202A may be configured to convey normal operational data received from node 12A out port 230A, via link 214B to node 202D, which in turn conveys that data to node 12B via ports 230J and 22C, respectively. In addition, node 202A may be configured to generate a packet of debug information corresponding to each group of N data packets (where N is an integer) received from node 12A. However, rather than conveying the generated debug packets out port 230A, node 202A may be configured to convey the debug data via a non-timing critical port 230B, via link 214A to node 202D, which is configured to convey data received on port 240I to node 12C via link 216 for observation. Advantageously, debug information may be generated corresponding to normal operational data which is then extracted and conveyed to a convenient observation point, node 12C, for observation or capture. However, because insertion of debug data into an in-use stream may impact system operation and latencies, selection of paths and points of debug data extraction should be carefully selected.

Also previously mentioned is the ability to duplicate, or "clone", and route a data stream for observation at a particular observation point. For example, node 202D in FIG. 2 may be configured to receive ordinary data communications from node 202A via port 240J. Node 202D may also be configured to convey all data received on port 240J to node 12B via port 230J as part of its normal system operation. However, in addition to conveying the received data stream via port 240J to node 12B, node 202D may also be configured to duplicate the received data stream and convey the duplicate data stream to node 12C for observation. Utilizing such a technique, any data stream may be duplicated within a system and conveyed to a desired observation point.

Figure 3:
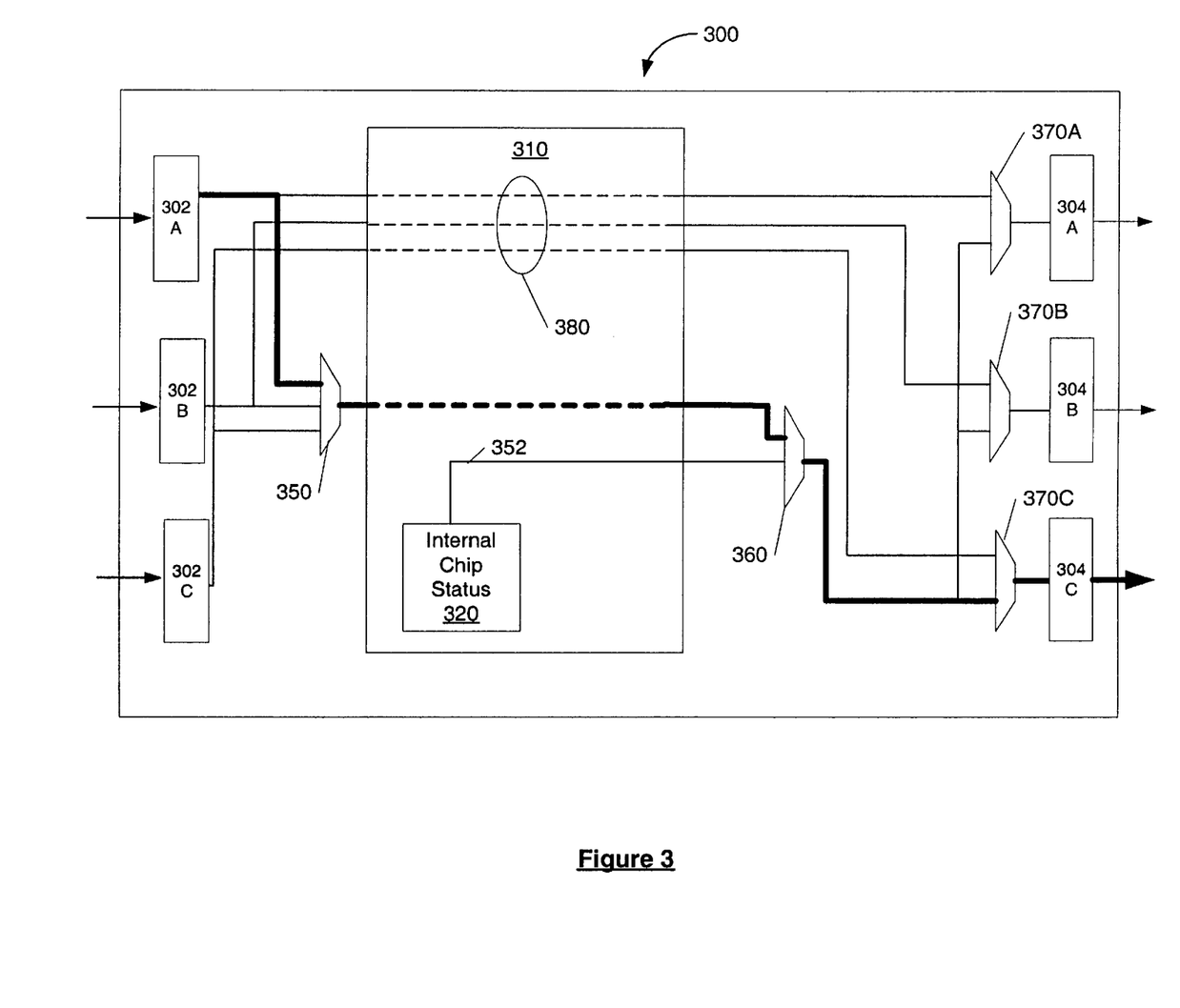
FIG. 3 is an illustration of a portion of a node.

Turning now to FIG. 3, one embodiment of a portion of a node 300 is shown. Node 300 includes input ports 302A–302C and output ports 304A–304C. Also included in node 300 is control circuit 310 and multiplexors 350, 360 and 370A–370C. Input ports 302 are coupled to control circuit 310 and multiplexor 350. Control circuit 310 is further coupled to multiplexors 360 and 370. Finally, multiplexors 370A–370C are coupled to output ports 304A–304C, respectively. In FIG. 3, an internal chip status 320 is illustrated by block 320. In one embodiment, control circuit 310 may enable, disable, or otherwise configure input ports 302 and output ports 304. Control circuit 310 may also be configured to select particular inputs for conveyance from multiplexors 350, 360 and 370. In the embodiment shown, a standard data path 380 through node 300 is indicated. In addition, an alternate data path coupled to multiplexors 350 and 360 is shown. During operation, node 300 may include an internal state 320. Frequently, the internal state 320 may include the contents of a number of registers or other storage devices within node 300.

In a first example of operation, node 300 is utilized to convey a received status data steam. Node 300 is configured to convey normal operational data via port 302C, along normal data path 380 to multiplexor 370A where it is output on port 304A. Node 300 is configured to receive a status data stream from another device on port 302A. The received status data stream is conveyed via multiplexors 350, 360 and 370C where it is output on port 304C. In a second example, node 300 is configured to convey its own internal state. When conveying its own internal chip status 320, rather than conveying the output of multiplexor 350 from multiplexor 360, control circuit 310 is configured to select input 352 to multiplexor 360 for conveyance. The conveyed internal state may then be output via one of multiplexors 370 and ports 304. In a third example, control circuit may be configured to duplicate the data stream received via port 302A and convey the duplicate stream to multiplexor 370C where it is output via port 304C. In a fourth example, control circuit may be configured to generate debug information corresponding to the normal operational data received via port 302A, convey the normal operation data via port 304A, and convey the debug information via port 304C. Still further, control circuit may be configured to receive a data stream and corresponding debug data via port 302A, separate the debug data from the data stream, convey the data stream via port 304A, and convey the separated debug data via port 304C.

Reference Data Streams and Wider Patterns

In an alternative embodiment, more than one path may be utilized for the transmission of data during test and debug. By utilizing a reference data stream, analysis of observed data may be made more efficient, and it may be possible to "combine" multiple data streams which have been captured in a manner which provides valuable information. For example, a second data stream may be utilized as a "reference" in order to more easily correlate a first and second captured data stream. In such an embodiment, a first path may be used for the transmission and capture of a first data stream. The first data stream may include internal status data, may correspond to a predetermined test pattern, or may simply correspond to ordinary system operation. In addition to the first data stream, a reference data stream is created on a second path which corresponds to the first data stream. The reference data stream ("reference data") may be as simple as a single bit of data, may include a small sequence of data bits, or may comprise a significant stream of data. For example, the reference data stream may include a "start" signal or pattern, or a "count", which correlates the first data pattern with its corresponding test or input data. The generated reference data stream is routed and captured in a manner similar to the first data stream. By correlating the reference data stream to the captured first data stream, the test engineer may be better able to identify relevant aspects of the captured test data. Alternatively, a reference start pattern may be utilized which may precede corresponding data which is subsequently captured.

Further, the use of a reference stream may make it possible to expand the observable behavior of a system. For example, during operation, it may be possible to only capture a limited number of data streams as described above. However, the test engineer may wish to analyze a larger set of data to further facilitate the debug process. To accomplish this task, a first data stream and corresponding reference stream may be captured as described above. Subsequently, a second test may be run (perhaps identical to the first) and a second data stream and corresponding reference stream captured. In this manner, the test engineer may utilize the captured reference data to correlate the first data stream to the second. Consequently, separately captured data streams may be combined into a larger data set which may reveal system behavior not ascertainable from a single data stream alone. Advantageously, a larger view of the behavior of a system may be observed.

Figure 4:
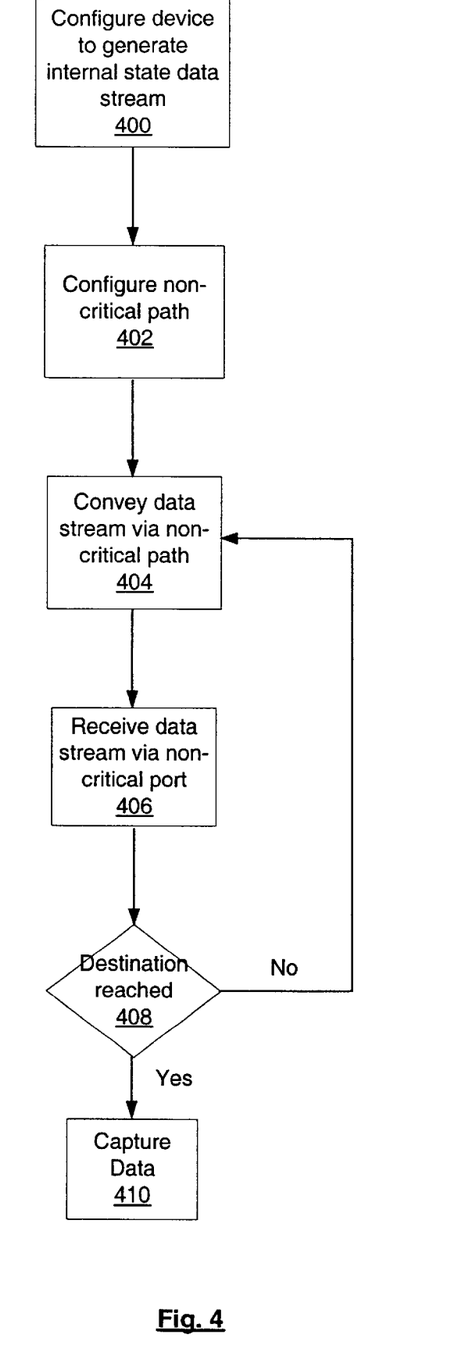
FIG. 4 is flow diagram illustrating a method of observing test and debug data.

Turning now to FIG. 4, one embodiment of a method of observing the internal state of a node shown. Initially, the device or node is configured to generate a data stream (block 400) which corresponds to its internal state. In addition, the device is configured (block 402) to convey the generated data stream via a non-critical path. In one embodiment, configuring the device to convey the data stream via a non-critical path may include outputting the data stream on a disabled port, replicated port, dedicated monitor port, or otherwise non-critical port. Also, in one embodiment, configuration of the device to generate the internal state data stream and to convey the data stream via a non-critical path may be done by setting selected internal configuration registers of the device to a particular value. The internal state data stream is then conveyed (block 404) via the non-critical path. Subsequently, the data stream is received (block 406) and a determination is made as to whether the conveyed data has reached its final destination (decision block 408). If the data has not reached its final destination, the data corresponding to the data stream is conveyed via a non-critical path to a next destination (block 404). If the data has reached its final destination (decision block 408), the data may be captured for observation (block 410).

Figure 5:
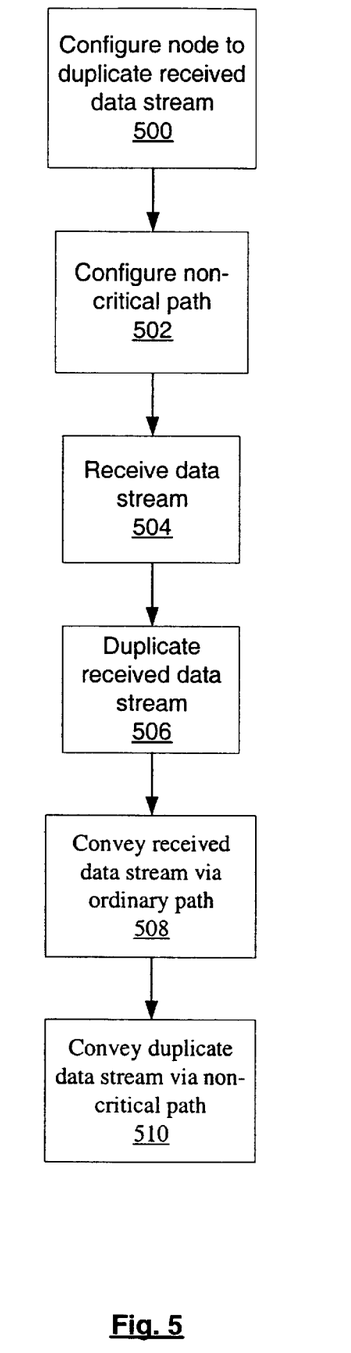
FIG. 5 is flow diagram illustrating a method of observing duplicated data.

FIG. 5 is an illustration of one embodiment of a method for duplicating and conveying an ordinary operational data stream. A node is initially configured to generate a duplicate data stream corresponding to a data stream received on a particular port (block 500). In addition, the node is configured to convey the received data stream via a normal path, and the duplicate data stream via a non-critical path corresponding to a desired observation point (block 502). Subsequently, a data stream is received by the node (block 504) and duplicated (block 506). The received data stream is then conveyed via the normal data path (block 508) and the duplicate data stream is conveyed via the configured non-critical path.

Figure 6:
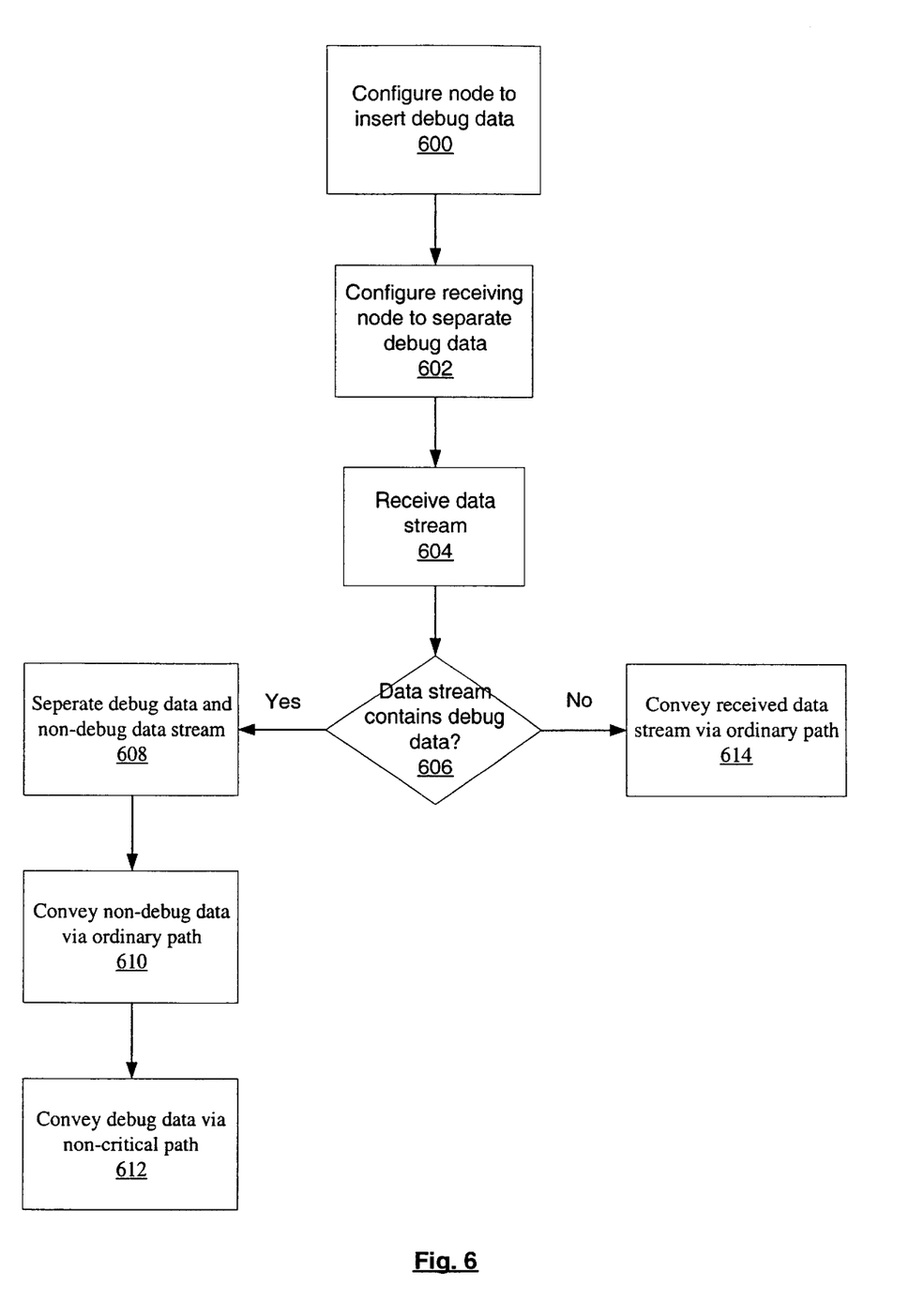
FIG. 6 is flow diagram illustrating a method of inserting and observing debug data.

Finally in FIG. 6, one embodiment of a method for inserting and observing debug data is illustrated. A first node is configured to insert debug data corresponding to a data stream into the data stream (block 600). In addition, a second node is configured to detect and separate debug data from a received data stream for conveyance via a non-critical path (block 602) to an observation point. Subsequently the second node receives a data stream from the first node (block 604). The second node then determines whether the received data stream contains debug data (decision block 606). If the second node determines there is no debug data present in the data stream, the received data stream is conveyed via a normal data path (block 614). However, if the second node determines debug data is present in the received data stream, the debug data is separated from the remainder of the data stream (block 608), the remaining data stream is conveyed via an ordinary data path (block 610), and the debug data is conveyed via a configured non-critical path (block 612).

Numerous variations and modifications will become apparent to those skilled in the art once the above disclosure is fully appreciated. It is intended that the following claims be interpreted to embrace all such variations and modifications.

What is claimed is:

1. A method for observing data in a computing system, said method comprising:
  configuring a first path of communication between a first node of said system and a second node of said system, wherein said first path corresponds to normal operational data;
  configuring a second path between said first node and a third node of said system, wherein said second path corresponds to a non-critical path;
  configuring said first device to convey a first data stream via said first path and a second data stream via said second path;
  conveying a first data stream from said first device via said first path and a second data stream from said first device via said second data path;
  receiving said second data stream at said third node;
  wherein said non-critical path includes non-critical ports selected from the group consisting of: a disabled port, a replicated port, a dedicated monitor port, or an error correcting code (ECC) port.

2. The method of claim 1, wherein said first node is configured to generate said second data stream.

3. The method of claim 2, wherein said second data stream corresponds to an internal state of said first node.

4. The method of claim 2, wherein said first data stream comprises normal operational data, and wherein said second data stream comprises debug information corresponding to said first data stream.

5. The method of claim 4, further comprising extracting said first data stream and said second data stream from a third data stream received by said first node, wherein said extracting is performed by said first node.

6. The method of claim 5, further comprising:
  generating said third data stream by combining said debug data with normal operational data, wherein said third data stream is generated by a fourth node of said system; and
  conveying said third data stream from said fourth node to said first node.

7. The method of claim 2, wherein said second data stream is a duplicate of said first data stream.

8. The method of claim 1, further comprising:
  generating a reference data corresponding to said first and second data streams;
  conveying said reference data via a non-critical path; and
  receiving said reference data at an observation point.

9. A device comprising:
  a plurality of output ports; and
  control circuitry, wherein said control circuitry is configured to identify and convey a first data stream via a port of said output ports, and identify and convey a second data stream via a second port of said output ports, wherein said first port corresponds to normal operational data, and wherein said second port corresponds to a non-critical path;
  wherein said non-critical path includes non-critical ports selected from the group consisting of: a disabled port, a replicated port, a dedicated monitor port, or error correcting code (ECC) port.

10. The device of claim 9, wherein said control circuitry is configured to generate said second data stream.

11. The device of claim 10, wherein said second data stream corresponds to an internal state of said device.

12. The device of claim 9, said first data stream comprises normal operational data, and wherein said second data stream comprises debug information corresponding to said first data stream.

13. The device of claim 12, wherein said control circuitry is configured to extract said first data stream and said second data stream from a third data stream received by said device.

14. The device of claim 13, wherein said device is configured to receive said third data stream from a fourth node which is configured to generate said third data stream by combining said debug data with normal operational data.

15. The device of claim 9, wherein said second data stream is a duplicate of said first data stream.

16. The device of claim 9, wherein said control circuitry is further configured to:
  generate a reference data corresponding to said first and second data streams; and
  convey said reference data via said non-critical port.

17. The device of claim 9, wherein configuring said control circuitry includes setting control registers of said device to a predetermined value.

18. A computing system comprising:
  a first node configured to convey a first data stream via a first path and a second data stream via a second path;
  a second node coupled to said first node via said first path, wherein said first path corresponds to normal operational data; and
  a third node coupled to said first node via said second path, wherein said second path comprises a non-critical path;

wherein said non-critical path includes non-critical links selected from the group consisting of: a disabled link, a replicated link, a dedicated monitor link, or an error correcting code (ECC) link.

19. The computing system of claim 18, wherein said first node is configured to generate said second data stream.

20. The computing system of claim 19, wherein said second data stream corresponds to an internal state of said first node.

21. The computing system of claim 19, wherein said first data stream comprises normal operational data, and wherein said second data stream comprises debug information corresponding to said first data stream.

22. The computing system of claim 21, wherein said first node is configured to extract said first data stream and said second data stream from a third data stream received by said first node.

23. The computing system of claim 22, further comprising a fourth node configured to generate said third data stream by combining said debug data with normal operational data, and wherein said fourth node is configured to convey said third data stream from to said first node.

24. The computing system of claim 19, wherein said second data stream is a duplicate of said first data stream.

25. The computing system of claim 18, wherein said system is further configured to generate a reference data corresponding to said first and second data streams, wherein said reference data is conveyed via a non-critical path to an observation point.

26. A method for observing data in a computing system, said method comprising:
configuring a first path of communication between a first node of said system and a second node of said system, wherein said first path corresponds to normal operational data;
configuring a second path between said first node and a third node of said system, wherein said second path corresponds to a non-critical path;
configuring said first device to convey a first data stream via said first path and a second data stream via said second path;
conveying a first data stream from said first device via said first path and a second data stream from said first device via said second data path; and
receiving said second data stream at said third node;
wherein said second data stream is a duplicate of said first data stream.

27. A method for observing data in a computing system, said method comprising:
configuring a first path of communication between a first node of said system and a second node of said system, wherein said first path corresponds to normal operational data;
configuring a second path between said first node and a third node of said system, wherein said second path corresponds to a non-critical path;
configuring said first device to convey a first data stream via said first path and a second data stream via said second path;
conveying a first data stream from said first device via said first path and a second data stream from said first device via said second data path; and
receiving said second data stream at said third node;
generating a reference data corresponding to said first and second data streams; conveying said reference data via a non-critical path; and receiving said reference data at an observation point.

28. A method for observing data in a computing system, said method comprising:
configuring a first path of communication between a first node of said system and a second node of said system, wherein said first path corresponds to normal operational data;
configuring a second path between said first node and a third node of said system, wherein said second path corresponds to a non-critical path;
configuring said first device to convey a first data stream via said first path and a second data stream via said second path;
conveying a first data stream from said first device via said first path and a second data stream from said first device via said second data path;
receiving said second data stream at said third node;
wherein said first data stream comprises normal operational data, and wherein said second data stream comprises debug information corresponding to said first data stream;
extracting said first data stream and said second data stream from a third data stream received by said first node, wherein said extracting is performed by said first node.

29. A device comprising:
a plurality of output ports; and
control circuitry, wherein said control circuitry is configured to identify and convey a first data stream via a port of said output ports, and identify and convey a second data stream via a second port of said output ports, wherein said first port corresponds to normal operational data, and wherein said second port corresponds to a non-critical path;
wherein said second data stream is a duplicate of said first data stream.

30. A device comprising:
a plurality of output ports; and
control circuitry, wherein said control circuitry is configured to:
identify and convey a first data stream via a first port of said output ports;
identify and convey a second data stream via a second port of said output ports;
generate a reference data corresponding to said first and second data streams; and
convey said reference data via a non-critical port;
wherein said first port corresponds to normal operational data, and wherein said second port corresponds to a non-critical path.

31. A device comprising:
a plurality of output ports; and
control circuitry, wherein said control circuitry is configured to identify and convey a first data stream via a port of said output ports, and identify and convey a second data stream via a second port of said output ports, wherein said first port corresponds to normal operational data, and wherein said second port corresponds to a non-critical path;
wherein configuring said control circuitry includes setting control registers of said device to a predetermined value.

32. A device comprising:

a plurality of output ports; and control circuitry, wherein said control circuitry is configured to identify and convey a first data stream via a port of said output ports, and identify and convey a second data stream via a second port of said output ports, wherein said first port corresponds to normal operational data, and wherein said second port corresponds to a non-critical path;

wherein said first data stream comprises normal operational data, and wherein said second data stream comprises debug information corresponding to said first data stream; and wherein said control circuitry is configured to extract said first data stream and said second data stream from a third data stream received by said device.

33. A computing system comprising:

a first node configured to convey a first data stream via a first path and a second data stream via a second path;

a second node coupled to said first node via said first path, wherein said first path corresponds to normal operational data; and a third node coupled to said first node via said second path, wherein said second path comprises a non-critical path;

wherein said second data stream is a duplicate of said first data stream.

34. A computing system comprising:

a first node configured to convey a first data stream via a first path and a second data stream via a second path;

a second node coupled to said first node via said first path, wherein said first path corresponds to normal operational data; and a third node coupled to said first node via said second path, wherein said second path comprises a non-critical path;

wherein said system is further configured to generate a reference data corresponding to said first and second data streams, wherein said reference data is conveyed via said non-critical path to an observation point.

35. A computing system comprising:

a first node configured to convey a first data stream via a first path and a second data stream via a second path;

a second node coupled to said first node via said first path, wherein said first path corresponds to normal operational data; and a third node coupled to said first node via said second path, wherein said second path comprises a non-critical path;

wherein said first data stream comprises normal operational data;

wherein said second data stream comprises debug information corresponding to said first data stream;

wherein said first node is configured to extract said first data stream and said second data stream from a third data stream received by said first node.

* * * * *

UNITED STATES PATENT AND TRADEMARK OFFICE
CERTIFICATE OF CORRECTION

PATENT NO. : 6,772,369 B2
DATED : August 3, 2004
INVENTOR(S) : Smith et al.

It is certified that error appears in the above-identified patent and that said Letters Patent is hereby corrected as shown below:

Column 10,
Line 36, please insert -- wherein -- between "claim 9," and "said".

Signed and Sealed this

Twenty-fifth Day of January, 2005

JON W. DUDAS
*Director of the United States Patent and Trademark Office*